June 25, 1929.  A. A. SCARLETT  1,718,762
PLOW
Filed April 6, 1927    3 Sheets-Sheet 2

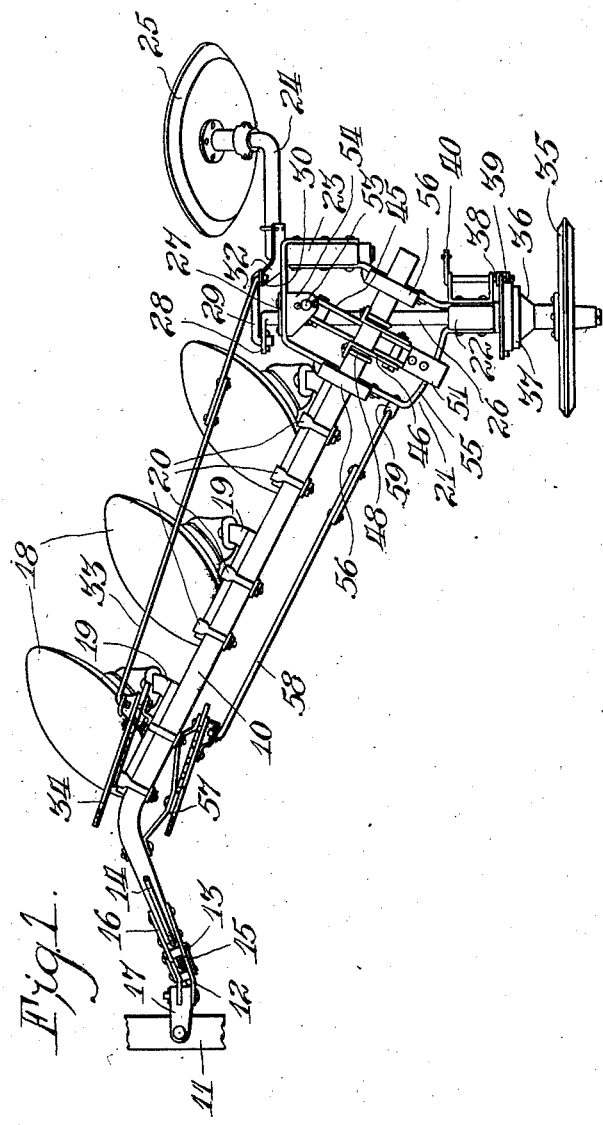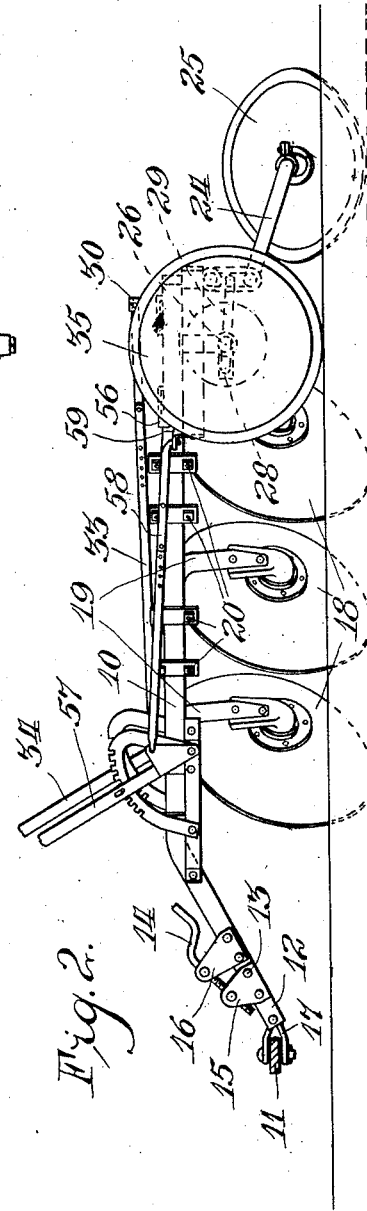

Inventor.
Arthur A. Scarlett.
By W. P. Disolade
Atty.

June 25, 1929.　　A. A. SCARLETT　　1,718,762

PLOW

Filed April 6, 1927　　3 Sheets-Sheet 3

Inventor.
Arthur A. Scarlett.
By H. P. Doolittle
Atty.

Patented June 25, 1929.

1,718,762

UNITED STATES PATENT OFFICE.

ARTHUR A. SCARLETT, OF CANTON, ILLINOIS, ASSIGNOR TO INTERNATIONAL HARVESTER COMPANY, A CORPORATION OF NEW JERSEY.

PLOW.

Application filed April 6, 1927. Serial No. 181,369.

The present invention is directed to improvement in the construction of plows, and more particularly disk gang plows intended for use with tractors.

The main object of the inventon is to simplify and improve the frame structure of a plow embodying the general organization and manner of lifting and lowering disclosed in the patent to Lindgren 1,387,500 August 16, 1921, and to include in the structure means whereby the frame may be accommodated to a variable number of plow units and whereby the supporting wheels may be angularly adjusted with respect to the plow carrying frame, to counteract side drift as in hillside work. A further object is to embody the adjusting and lifting means of the plow in a unitary structure constituting its rear support. Still another object is to transmit the power for lifting and lowering the plow to the furrow wheel axle in a novel and simplified manner. Other minor objects and advantages will become apparent through the more specific description hereinafter given of the organization and details of construction in which the invention resides.

Referring to the drawings:

Figure 1 is a plan view of a disk gang plow construction embodying the invention;

Figure 2 is a similar side view;

Figure 3 is a plan view, on an enlarged scale, of the rear portion of the plow showing more particularly the rear frame unit;

Figure 5 is a plan view, similar to Figure 3, showing a modification;

Figure 7:
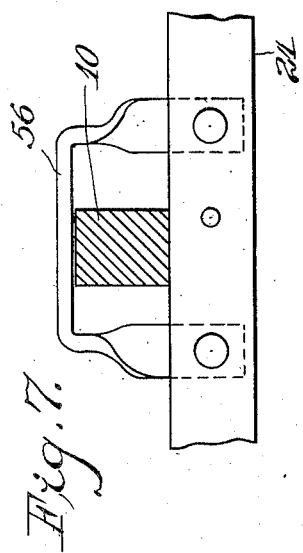
Figure 7 is a similar view on the line 7—7 of Figure 3.
Figure 8:
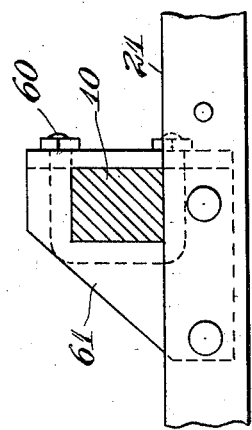
Figure 8 is a similar detail view of the modified structure on the line 8—8 of Figure 5.

In its preferred form the invention is comprised in a disk gang plow having a main longitudinal beam 10, the front end of which is deflected laterally towards the land side of the plow and dropped or bent downwardly, as shown in Figures 1 and 2. The forward end of main beam 10 is thereby brought to the approximate level of the drawbars of tractors, indicated at 11. The extreme end of bar 10 is preferably made as a vertically adjustable piece 12 pivoted at 13 to the beam proper and adjustable by such means as a screw 14 engaged in suitable pivoted collars carried between bracket plates 15 and 16 on the end piece and beam, respectively. The end piece 12 is provided with the usual clevis 17 through which a loose coupling with a tractor or drawbar 11 is effected.

The main beam 10 extends diagonally with respect to the draft receiving end and carries a plurality of plow units illustrated as disks 18 carried on standards or beams 19 which are detachably secured to the beam 10 as by clamps 20. The standards 19 are so shaped as to offset the disks to the right or furrow side of the beam 10.

Figure 4:
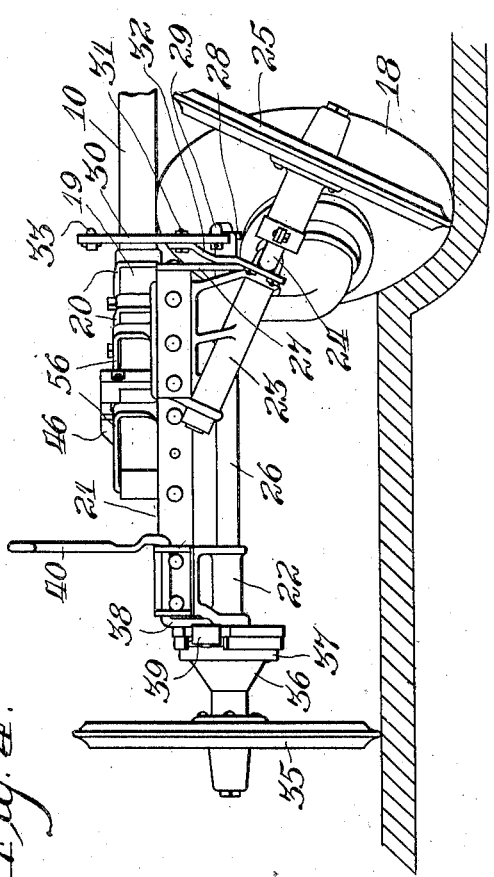
Figure 4 is a rear view of the structure seen in Figure 3.

The rear portion of beam 10 is carried on a unitary structure of novel construction to which the beam is connected in a novel manner. The said supporting structure preferably comprises a substantially quadrangular skeleton frame 21 composed of flat bars bent to required shape, as shown in Figures 3 and 5, and including offset bearing sleeves 22 and 23 located at each rear angle of the frame on parallel vertical planes extending diagonally to the frame. The sleeve 23 is inclined, as shown in Figure 4, and receives the upper arm of a cranked axle 24 on the lower arm of which the furrow wheel 25 is journaled. The sleeve 22 receives a shaft or axle 26 which projects beyond the sleeve toward the landward side of the frame and which extends diagonally across beam 10 and the frame 21, below beam 10, and has its end journaled in a depending bracket 27 in alignment with sleeve 22. This end of shaft 26 is provided with a crank arm 28 connected by a link 29 with the lower end of a lever 30 (Figure 4) pivotally connected at 31 to a fixed crank arm 32 which is fastened to the crank axle 24 at its upper angle, as best seen in Figures 3 and 5. The upper end of lever 30 has pivotally connected to it, an extensible link or rod 33, the forward end of which is connected to an adjusting or rack lever 34 mounted on the forward portion of the beam 10.

The landward end of shaft 26 has journaled on it the land wheel 35 which is herein disclosed as the driving element of power lift mechanism. This power lift mechanism consists of a bell shaped housing 36 fixed to and rotating with wheel 35 and forming one section of a half revolution clutch of the type in common use and more particularly described in the Lindgren patent above referred to. The second section of the clutch consists of a disk 37 which is keyed to shaft 26. The disk 37 is provided with the usual opposite seats or notches into which there projects the control elements for the interlocking elements of the clutch carried by the respective sections thereof. A spring pressed trip arm 38 provided with a roller 39 is located on the frame so as to cooperate with the clutch disk 37 and lodge in the trip notches therein. This trip dog is actuated by the usual pull rope attached to an arm 40 thereon, and each actuation of the trip serves to withdraw the roller from a clutch seat, thereby causing the wheel 35 and shaft 26 to become interlocked for substantially a half revolution, when the clutch will be disengaged through re-engagement of the trip arm with the opposite clutch seat.

The structure so far described is common to both species of the invention, as shown in Figures 3 and 5, and it is to be noted that the lifting and lowering of the plow disks is effected by a tilting of the plow as a whole about an axis extending from the hitch point on the front support or tractor to the tread point of the land wheel 35. This tilting is effected in this instance by the half revolutions imparted to shaft 26 through the intermittent clutch mechanism, thereby correspondingly rotating the crank arm 28. As arm 28 is connected to crank axle 24 through link 29, lever 30, and arm 32, and, as lever 30 is normally held in fixed position by link 33 at its upper end, each half revolution of the crank arm 28 will shift the crank shaft 24 alternately in opposite directions, tilting the plow, as stated. By provision of the lever 30 connected at its middle to arm 32 on the crank axle and at its respective ends to the links 29 and 33, it is made possible to adjust the disks for depth. This is effected by hand lever 34, which serves to rock lever 30 on its connection to link 28 as a fulcrum, thereby correspondingly rocking arm 32 and crank axle 24.

Figure 6:
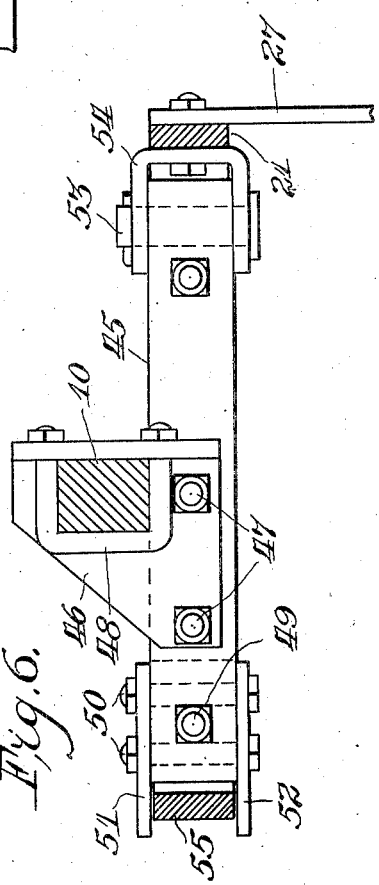
Figure 6 is an enlarged detail, sectional view on the line 6—6 of Figure 3.

In the species of the invention shown by Figure 3, provision is made for angular adjustment of frame 21 on main beam 10 in a horizontal plane. For this purpose a cross member 45, preferably formed from a flat bar bent into elongated U-shape as seen in Figure 3, is fixed under the beam 10 by a pair of brackets 46 (Figure 6), each formed with angularly related flanges, one of which is apertured to receive beam 10 and bolted to the member 45 as at 47 and the other flange clamped to the beam 10 as by a U-bolt 48. Between the ends of the arms of the bent bar constituting the cross member 45, a block is secured by bolt 49 on the upper and lower faces of which are fixed, as by bolts 50, laterally projecting guide plates 51 and 52, which straddle the portion of the bar forming one side of frame 21. The opposite end, or bight portion, of crossbar 45 is pivoted on a vertical pin 53 carried by a bracket 54 fixed to the opposite inner side of frame 21, the side of frame 21 engaged by the guide plates 51 and 52 being preferably curved on an arc about the pivot point 53, as at 55. The front and rear members of frame 21 are provided with yoke pieces 56 (Figure 7) enclosing beam 10 and sufficiently wide to allow for desired range of angular movement of the frame 21 on pivot 53. To effect such movement or adjustment, there is provided a rack lever 57 on the forward end of beam 10 connected by an extensible link 58 pivoted at 59 to frame 21. Lever 57 as well as lever 34 are within convenient reach of the operator's station on a tractor, and adjustment of the plow for depth and for side drift is, therefore, made easy.

In the species of Figure 5 no angular adjustment for the frame 21 is provided, as this may be omitted in the broader aspect of the invention. In both species, however, provision is made for adjustment of frame 21, and parts carried thereby, as a unit longitudinally of beam 10, thus permitting the plow to be converted, for example, from a three disk gang to a two disk, the frame 21 being moved up on the beam after removal of the third disk. In the species of Figure 3, this can be readily done by loosening the U-bolts 48 on crossbar 45. In the species of Figure 5, similar U-bolts 60 are used, but here they are carried by brackets 61, similar in structure to brackets 46 but secured to the front and rear members, respectively, of frame 21. By loosening the bolts 60, adjustment of frame 21 may be effected as in the other species.

The structure disclosed accordingly exemplifies a convertible gang plow of the single main beam, directly tractor connected, tilting lift type, characterized by provision of a unitary, wheel supported rear frame easily adjustable longitudinally and also capable of angular adjustment horizontally. The scope of the invention is defined in the following claims:

What is claimed is:

1. A plow frame structure comprising an extended longitudinal beam and a rear support, said support comprising a frame extending across the rear part of the beam, clamping means connecting the beam and frame, a straight land wheel axle journaled on the frame and extending across it, a land wheel journaled on one end of said axle, a furrow wheel journaled on a cranked axle having one end mounted in a bearing on the frame adjacent the other end of said land wheel axle, an arm fixed on each axle, a link connected to one of said arms, a lever pivoted intermediate its ends on the other arm and pivotally connected to the link, means for adjusting the lever about its pivot on the arm, and means for effecting partial rotation of the land wheel axle.

2. A plow frame structure comprising an extended longitudinal beam and a rear support, said support comprising a frame extending across the rear part of the beam, clamping means connecting the beam and frame, a straight land wheel axle journaled on the frame and having a fixed arm at the furrow-ward side of the frame, a land wheel journaled on said axle at the opposite side of the frame, a furrow wheel journaled on a cranked axle having one end mounted in a bearing on the frame on a vertical plane parallel to the land wheel axle, a fixed arm on said cranked axle, a lever pivoted between its ends on said arm, a link connecting one end of said lever to the crank arm on the land wheel axle, adjusting means connected to the other end of said lever, and means for effecting partial rotation of the land wheel axle.

3. A plow frame structure comprising an extended longitudinal beam and a rear support, said support comprising a frame having a bar extending across the beam, brackets on the bar slidably receiving the beam, means on the brackets for clamping the beam, a skeleton frame enclosing said bar and pivoted to one end thereof on a vertical axis, means slidably connecting the other end of said bar with the skeleton frame, a land and a furrow wheel carried by the skeleton frame, an adjusting lever on the beam, and a link between said lever and the skeleton frame.

4. A plow frame structure comprising an extended longitudinal beam and a rear support, said support comprising a frame having a bar extending across the beam and clamped thereto and a skeleton frame enclosing said bar and pivoted to one end thereof on a vertical axis, means slidably connecting the other end of said bar with the skeleton frame, a land and a furrow wheel carried by the skeleton frame, an adjusting lever on the beam, and a link between said lever and the skeleton frame.

5. A plow frame structure comprising an extended longitudinal beam and a rear support, said support comprising a two part frame including a section extending across the rear part of the beam, clamping means connecting said section to the beam, a second section pivoted to the clamped section at one end thereof on a vertical axis and also extending across the beam, a land and a furrow wheel carried by the pivoted section, and means for adjusting said section on its pivot comprising an adjustable connection between said pivoted section and the beam.

6. A plow frame structure comprising an extended longitudinal beam and a rear support, said support comprising a frame extending across the beam, said frame having a section clamped to the rear part of the beam and a section pivoted to the clamped section on a vertical axis, a land and a furrow wheel carried by the pivoted section, and means for adjusting the pivoted section on its axis.

7. A plow structure comprising an extended beam having a laterally offset forward end adapted for connection to a draft vehicle and a straight plow carrying portion disposed obliquely to said forward end, and a unitary rear support for said beam comprising a frame pivotally connected to the beam on an upright axis, a land and a furrow wheel carried by said frame and positioned to tread on lines extending diagonally to the straight portion of the beam, and means connecting said beam and frame for adjusting the frame on its pivot.

8. A plow structure comprising an extended beam having a downwardly and laterally inclined forward portion adapted for connection to a draft vehicle and a straight plow carrying portion disposed obliquely to said forward portion, and a unitary rear support for said beam comprising a frame having means for adjustment longitudinally of the beam, and means for angular adjustment on a horizontal plane, said frame including supports for a land and a furrow wheel.

9. A plow comprising a plow carrying beam and a rear support, said support comprising a frame secured on the beam, a straight axle journaled in bearings on said frame and extending across the beam, a ground wheel on one end of said axle at one side of said beam, a cranked axle journaled on said frame with its crank end projecting at the opposite side of said beam, a second ground wheel journaled on the end of said cranked axle, means for effecting successive partial rotations of said straight axle in one direction, means for rocking the cranked axle in opposite directions by the successive rotations of said axle including means for adjusting the cranked axle comprising an arm on the end of the straight axle, and relatively adjustable actuating links pivoted to each other and respectively pivoted to the end of said arm and to the cranked axle.

In testimony whereof I affix my signature.

ARTHUR A. SCARLETT.